(12) United States Patent
Kroener

(10) Patent No.: US 9,120,561 B2
(45) Date of Patent: Sep. 1, 2015

(54) LOAD CARRIER FOR AIRCRAFT

(75) Inventor: Christoph Kroener, Schweltenkirchen (DE)

(73) Assignee: LFK-LENKFLUGKOERPERSYSTEME GMBH, Schrobenhausen (DE)

( * ) Notice: Subject to any disclaimer, the term of this patent is extended or adjusted under 35 U.S.C. 154(b) by 517 days.

(21) Appl. No.: 13/495,242

(22) Filed: Jun. 13, 2012

(65) Prior Publication Data

US 2012/0318916 A1    Dec. 20, 2012

(30) Foreign Application Priority Data

Jun. 14, 2011   (DE) .......................... 10 2011 106 489

(51) Int. Cl.
*B64D 7/06*   (2006.01)
*B64C 27/04*   (2006.01)
*F41F 3/065*   (2006.01)

(52) U.S. Cl.
CPC . *B64C 27/04* (2013.01); *B64D 7/06* (2013.01); *F41F 3/065* (2013.01)

(58) Field of Classification Search
CPC ........................................................ B64D 7/06
USPC ............... 244/118.1, 137.4; 396/12; 348/117; 89/37.16

See application file for complete search history.

(56) References Cited

U.S. PATENT DOCUMENTS 1,638,962 A * 8/1927 Schneider ........................ 89/205
6,334,591 B2 * 1/2002 Charest et al. ............. 244/137.2

* cited by examiner

*Primary Examiner* — Justin Benedik
(74) *Attorney, Agent, or Firm* — Crowell & Moring LLP

(57) ABSTRACT

A load carrier for aligning a load of an aircraft is provided. The load carrier includes a carrier unit for mounting the load carrier on the aircraft, a load unit for mounting the load and a bearing unit for pivoting the load unit with respect to the carrier unit. The bearing unit has at least one curved rail element and at least one car element, which is displaceable along the rail element.

19 Claims, 3 Drawing Sheets

LOAD CARRIER FOR AIRCRAFT

CROSS-REFERENCE TO RELATED APPLICATIONS

The present application claims priority under 35 U.S.C. §119 to German Patent Application No. 10 2011 106 489.7, filed Jun. 14, 2011, the entire disclosure of which is herein expressly incorporated by reference.

FIELD OF THE INVENTION

Exemplary embodiments of the present invention relate to a load carrier for aligning a load of an aircraft, a helicopter having a load carrier and the use of a load carrier.

BACKGROUND OF THE INVENTION

The inclination of a helicopter about its transverse axis may vary greatly during the different phases of flight (hovering, climbing, cruising, etc.) due to the design. As a result, an exterior load attached to the helicopter develops an unfavorable aerodynamic characteristic.

In particular, for stable forward flight, helicopters tilt the rotor plane forward to tilt the thrust vector of the main rotor in the direction of flight. This tilting of the rotor plane may lead to tilting of the entire helicopter about the transverse axis. Mounted exterior loads in this case also tilt about the transverse axis and then are exposed to oncoming cross-flow by the surrounding air in an unfavorable manner. It may therefore be advisable to align the exterior loads in accordance with the air flow. An electromechanical load carrier may therefore be used to align an exterior load about the transverse axis in the direction of flight of the helicopter.

Furthermore, when using weapon carriers as the exterior load, the load carrier is used as an aiming unit, which makes it possible to aim the weapon at the target independently of the position of the helicopter.

In this second application, an alignment of the exterior load by the load carrier (in this case a weapon carrier) may be used for aiming. The weapons, mounted as an exterior load, can be aligned with the target in this way, independently of movements of the helicopter.

For pivoting the exterior load, a trapezoidal guide for the exterior load may be used and can be driven by a linear actuator. Disadvantages of this arrangement may include the relatively large forces acting on the actuator because the effective lever of the center of gravity can be displaced significantly by adjusting the kinematics. Another disadvantage may be the space required for the rod of a trapezoidal guide.

SUMMARY OF THE INVENTION

Exemplary embodiments of the present invention are directed to an exterior load carrier of a simple design that saves space and may also have the required control precision, control speed and the required environmental resistance.

Another aspect of the invention relates to a load carrier for aligning a load of an aircraft. The aircraft may be a helicopter.

According to one embodiment of the invention, the load carrier comprises a carrier unit for attaching the load carrier to the aircraft. The load carrier may thus be rigidly mounted on the aircraft via the carrier unit. The carrier unit may be designed to be mounted using a structure such as a NATO flange that is permanently mounted on the helicopter. Many helicopters have such standardized structures with which load carriers can be attached.

According to one embodiment of the invention, the load carrier comprises a load unit for fastening the load. The load unit may be mechanically rigidly connected to the load, so that the load carrier can be interpreted as a swivel joint between the load and the aircraft. In particular, the load unit may be mounted to be pivotable with respect to the carrier unit. As a rule, the load and the load carrier are arranged outside of the fuselage of the aircraft and the load may be an exterior load, while the load carrier may be an exterior load carrier.

According to one embodiment of the invention, the load carrier comprises a bearing unit for swiveling the load unit with respect to the carrier unit. The bearing unit comprises at least one curved rail element and at least one car element that can be displaced along the rail element. The rail element is curved in particular. A rail element may be curved if it does not run in a linear path over essential sections. In particular the rail element may be bent so that it is curved toward the load, i.e., the load and/or the load unit is at least partially rounded.

The curved rail element makes it possible to rotate the load unit with the load about a range comprising the center of gravity of the load. This range may be interpreted as a virtual fulcrum. In other words the curved rail system may be used for supporting the load at the center of gravity about a virtual fulcrum. The rotation of the load about its center of gravity may have the advantage that a load-free angle adjustment may be achieved as much as possible.

The components of the bearing unit, such as the rail element and the car element, are configured for receiving the operating forces and supporting the exterior load with the least possible friction. They may include one or more rail elements and one or more car elements. The rail elements can be adapted by adapting the radius of bending to various loads.

It is self-evident that the term unit may be understood to refer to a modular group designed to exert the respective function of the unit. The bearing unit may thus be a module with which the load unit is supported with respect to the carrier unit.

According to one embodiment of the invention the rail element has two bearing surfaces, each running orthogonally to a pivot axis of the load element. The car element(s) may run on these bearing surfaces, for example, by means of ball bearings.

According to one embodiment of the invention the load unit is pivotable about a pivot axis with respect to the carrier unit. For example, the curved rail element may have a segment of a circle. If the radius of the rail element is selected so that the center of gravity of the load lies on the pivot axis, then forces acting on the load (which acts on the center of gravity) result in radial forces between the rail element and the car element. Thus, the reception of forces by the bearing and the movement of the load by the bearing, which usually takes place via essentially radially forces, may be almost completely decoupled.

In summary, the curved rail element may run on a circular path. The bearing surface(s) of the rail element may thus have a constant distance and/or radius from the pivot axis. As a rule the radius of the rail element will be between 0.3 and 0.8 m. There may be several advantages if the load carrier is guided over at least one curved rail element whose radius of curvature is matched precisely to a representative distance of the center of gravity of a load.

First, the load can be aligned and/or pivoted in a load-free manner. All forces acting on the load from the outside can be observed by the rail element. In this case, an adjustment factor and/or an actuator must move only the mass inertia of the load as well as overcome the friction in the bearing, and is therefore freed of the remaining forces (acceleration and deceleration, shooting loads, etc.).

Second, a small space for the load carrier may be achieved. The space may be smaller than with comparable load carriers and may thus lead to a lower aerodynamic resistance.

Third, by reducing exterior forces on the actuator, a higher control accuracy of the load carrier with respect to the pivot angle can be achieved. This may be important in particular when using the load carrier as a weapons carrier.

According to one embodiment of the invention the curved rail element extends over an angle range of approximately 45° to 65°, for example, from 50° to 60°. The bearing unit may comprise two car elements that are arranged with a spacing of approximately 30° on the curved rail element. A pivot range and/or control range between 20° and 30° may thus be achieved in this way.

According to one embodiment of the invention, a radius of the curved rail element is selected such that the load is pivotable by the load unit about a center of gravity of the load. Thus, when the center of gravity of the load is approximately at the fulcrum of the "virtual bearing," it is possible to move the load almost without applying force. In this case, the mass inertial forces as well as the bearing friction must essentially be overcome. These forces may be constant over the entire control range of the load carrier and thus may always act on the actuator act under the same force conditions over the entire control path. This may be the case with a circular rail element. The adjustment accuracy may thus also remain constant at a high level over the entire control path. The adjustment accuracy may also be independent of external forces acting on the exterior load.

According to one embodiment of the invention, the rail element is mechanically rigidly attached to the load element and the car element is mechanically rigidly attached to the carrier element. Alternatively, depending on the installation situation, it may also be appropriate alternatively to connect the rail element to the stationary structure, i.e., the carrier element, and to support the car element(s) in a movable manner together with the load element.

According to one embodiment of the invention, the bearing unit comprises a triggerable control element and/or an actuator. The actuator may be designed to induce the pivoting of the load unit with respect to the carrier unit. In other words, the load carrier may comprise an active actuator that performs the aligning and/or pivoting work. The actuator may have the task of supplying the force required for adjustment.

An actuator may comprise any type of mechanics capable of independently inducing a pivoting of the load unit. For example, the control element may comprise a linear motor, a linear actuator with an electric motor, a geared motor or a hydraulic piston. The actuator may be triggered by a control of the aircraft such that the load unit assumes a certain position with respect to the carrier unit.

According to one embodiment of the invention, the triggerable actuator comprises a control path transmitter, which is designed to detect a position of the actuator. In this way, the actuator can determine the current pivot position of the exterior load and relay this information to the corresponding control unit. The acknowledgment and/or return of the current control angle to the control electronics may thus be accomplished via a control path transmitter integrated into the actuator.

According to one embodiment of the invention, the triggerable actuator is designed to execute a linear movement that is converted into a pivoting movement of the load unit with respect to the carrier unit. The actuator may thus be a linear actuator. In general the actuator may be designed to actively change its extent in one direction. The actuator may be connected to the carrier unit at one end and to the load unit at its other end. When the actuator then undergoes a change in length, the car element is displaced on the curved rail element, and the load unit assumes a different position with respect to the carrier unit.

According to one embodiment of the invention, the triggerable control element comprises an actuator unit and a rod which are movable linearly toward one another by the triggerable actuator. The actuator unit may be rigidly connected to the car element either directly or indirectly. The rod may be connected to one end of the curved rail. For example, the piston rod of a hydraulic cylinder or the threaded rod of a linear drive may be connected to the end of the curved rail.

For example, the triggerable actuator may be designed as a motor with a gear ratio whose gear wheels act directly on the carrier structure of the curved rail or directly on the rail. In this way, the load carrier may be designed to be relatively compact.

According to one embodiment of the invention, the load unit surrounds a load lock for the load like brackets. A load lock may be a standardized interface with all the conventional exterior loads. The load unit may thus comprise an adapter structure with which the load lock can be connected to the load carrier. In addition, the load unit may have a standard interface for loads. Examples of load locks include Area HLRU or the Alkan 2037.

All loads are usually designed so that their center of gravity lies approximately precisely between the two fittings of a corresponding load lock. Thus, a great variance in the centers of gravity in the longitudinal axis of the helicopter is not to be expected.

Adaptation of the load carrier to the height of the center of gravity relative to the fastening can be achieved through a choice of a suitable rail radius. In other words a rail element having a certain rail radius may be selected. This rail radius is coordinated with the load which the load carrier should usually carry.

In summary, the load carrier may be mounted on the helicopter by means of a suitable structure. This structure permits mounting of the rail element(s) as well as the tying of an actuator, for example, a linear actuator. The other side of the rail element(s) as well as the other side of the linear actuator may be connected to the load lock via an adapter structure.

Another aspect of the invention relates to a helicopter with a load carrier such as that described above and below. As already state, the aircraft may be a helicopter. In particular the helicopter may be designed so that it tips itself when a rotor is tilted. This tilting movement may be compensated by a pivoting movement of the load carrier.

According to one embodiment of the invention, a pivot axis of the load element runs essentially parallel to the dipping axis of the helicopter. For example, the load carrier may be mounted to the side of the helicopter such that the rail element(s) run(s) essentially parallel to the center plane of the helicopter.

Another aspect of the invention relates to the use of a load carrier such as that described above and below, for pivoting a weapon on a helicopter. When weapons are aligned with a target, a great control accuracy, control acceleration and control accuracy may be required. This high control accuracy can be achieved if the control drive is decoupled from all loads, if possible, and need only perform its aligning work. This is possible with the load carrier described above and below.

Exemplary embodiments of the invention are described below with reference the accompanying figures.

BRIEF DESCRIPTION OF THE FIGURES

The reference numerals used in the figures and their meanings are given in summary form in the list of reference numerals. Essentially identical or similar parts are provided with the same reference numerals.

DETAILED DESCRIPTION OF EXEMPLARY EMBODIMENTS

Figure 1:
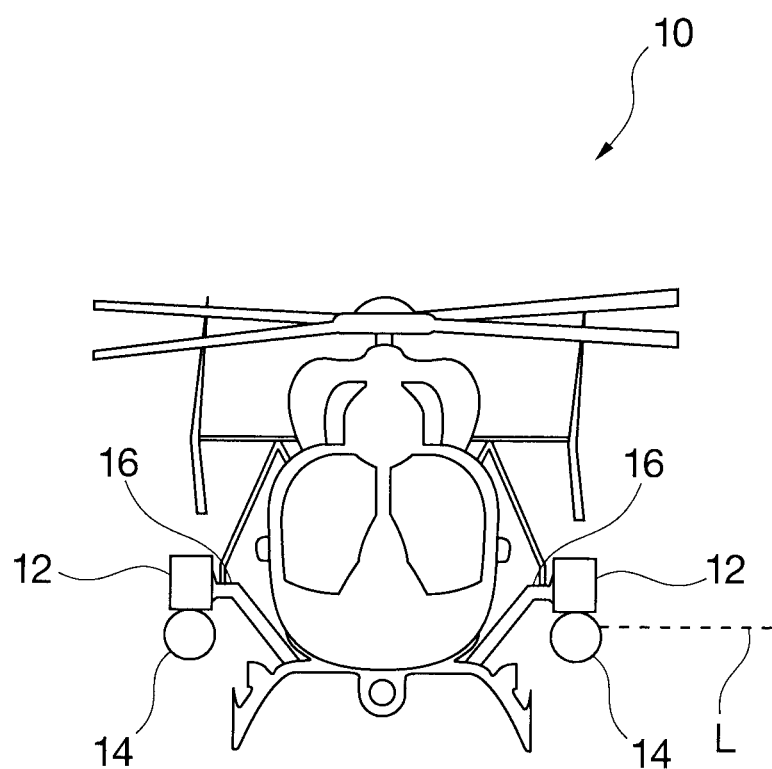
FIG. 1 shows a frontal view of a helicopter according to one embodiment of the invention.

FIG. 1 shows a frontal view of an aircraft in the form of a helicopter 10 to which a load carrier 12 is attached on both sides. A load 14, for example, weapons such as a rocket launcher is/are attached beneath each of the load carriers 12. The load 14 can be pivoted about the pitch axis of the helicopter 10.

Figure 2:
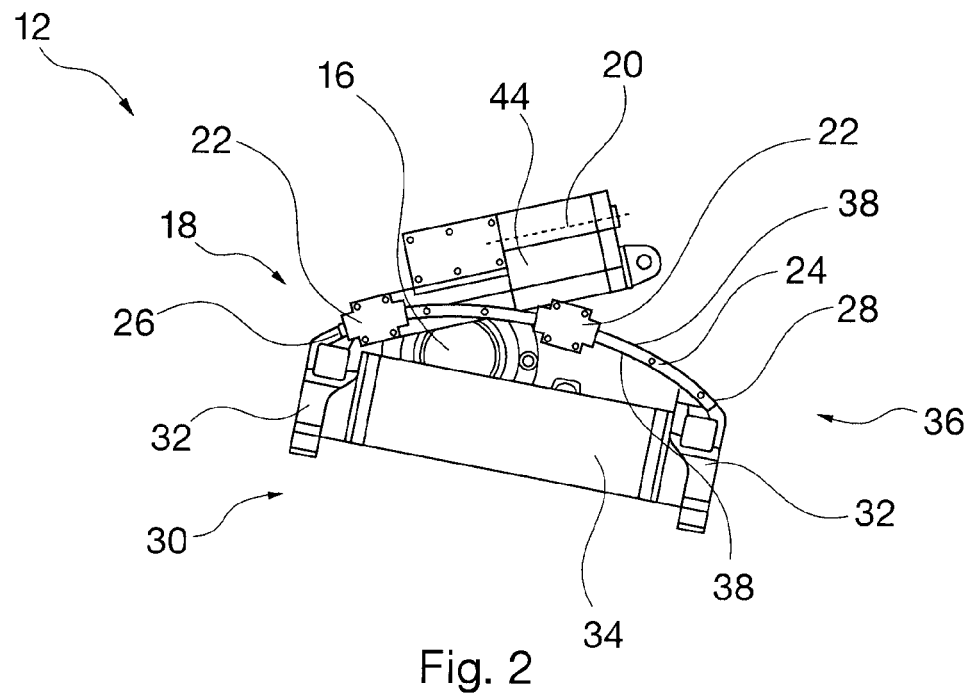
FIG. 2 shows a side view of a load carrier according to one embodiment of the invention.

FIG. 2 shows a side view of the load carrier 12 as seen from above. For fastening onto the helicopter 10 the load carrier 12 has a carrier unit 18. The helicopter 10 may have a standard mount 16, for example, a NATO flange 16 to which the load carrier 12 is mounted via the carrier unit 18. An actuator 20 and two cars 22 are mounted on a carrier unit 18, which is connected to the mount 16. A rail 24 may run in the cars 22, for example, via ball bearings between their ends 26, 28.

The ends of the rail 24 are again connected to a load unit 30, which is designed to carry a load 14 and secure it mechanically. The load unit 30 comprises an adapter structure 32 which extends around the load 14 and the load lock 34 like a clamp and serves to connect the load lock 34 to the rail 24.

The rail 24 and the cars 22 form a bearing unit 36 through which the load unit 30 is movable with respect to the carrier unit 18. The load unit 30 may pivot with respect to the pivot axis L about the carrier unit 18.

The rail 24 has two running surfaces 38, each pointing away from the load 14 or toward the load 14 and the cars 22 run on the running surfaces.

FIG. 2 shows the load carrier 12 in a first end position in which the first car 22 at the left is at the end 26 of the rail 24. Since the rail 24 is curved in a circle about the axis L in an angle range of approximately 55° (see also FIG. 4) and the two cars 22 are attached to the carrier unit 18 at a distance of 30° from one another with respect to the axis L, the load unit 20 can therefore pivot approximately 20° in relation to the carrier unit 18. The cars 22 are mounted on the carrier unit 18, so that the load unit 30 is deflected by 12° in the end position shown in FIG. 2. In FIG. 2 the load 14 thus has a maximal deflection of 12° upward.

Figure 3:
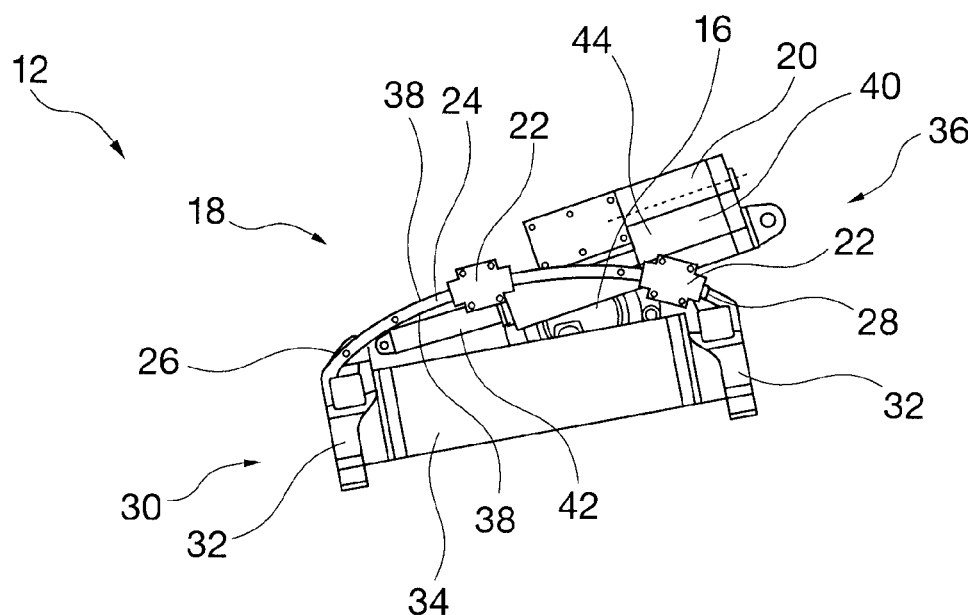
FIG. 3 shows the load carrier from FIG. 2 in a second end position.

FIG. 3 shows the load carrier 12 in a second end position in which the second car 22 at the right is at the end 28 of the rail 24. In this position the load unit is deflected by −8° with respect to the carrier unit 18. The load 14 in FIG. 3 has a maximum deflection of 8° downward.

FIG. 3 shows that the actuator unit 20 has an actuator unit 40 and a rod 42, which can be extracted out of the actuator unit 40 and retracted back into it. For example, the actuator unit 40 may comprise an electric motor which moves the rod 42 by means of a threaded rod with respect to the actuator unit 40.

The actuator unit 40 is attached to the carrier unit 18. The end of the rod 42 is attached to the end of the rail 24.

In addition, the actuator unit 40 may comprise a setpoint transmitter 44 which can determine the current angle between the load unit 30 and the carrier unit 18.

The actuator 20 (an electrical linear actuator 20 in the case shown here) is mounted between the structure 16 (e.g., NATO flange 16) permanently attached to the helicopter and the movable load unit 30. Any change in length of the actuator 20 causes a movement of the load unit 30 on the path determined by the guide rail 24. The rail 24 moves in the running paths 38 of the rail cars 22 in a frictionally optimized manner.

Figure 4:
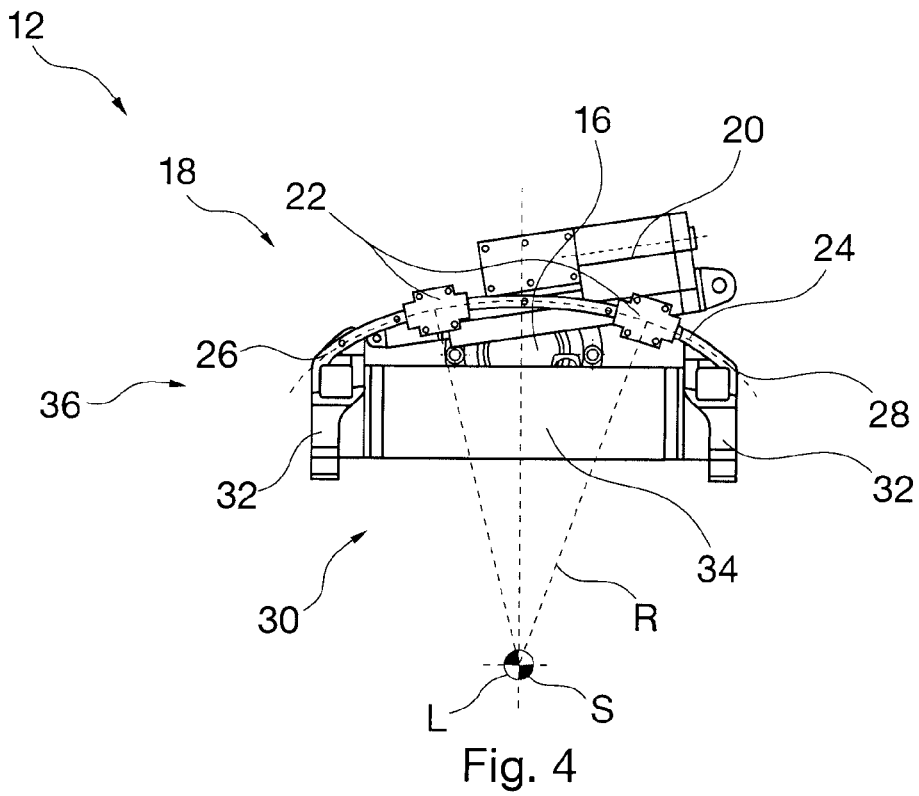
FIG. 4 shows the load carrier from FIG. 2 in an intermediate position.

FIG. 4 shows the load carrier 12 in an intermediate or middle position in which the cars 22 are arranged symmetrically with a central plane running at a right angle through the pivot axis L. The nominal state at 0° deflection for the load 14 is shown in the middle figure.

The rail 24 is curved in a circular shape with a radius R that has been selected, such that the center of gravity S of the load 14 lies on the pivot axis L which is determined by the radius R. In constructing the load carrier 12 and installing the load carrier 12 in the helicopter 10, the dimensions can be adjusted, in particular the rail radius R. The load carrier 12 can thus be adapted to different possible exterior loads 14.

Figure 5:
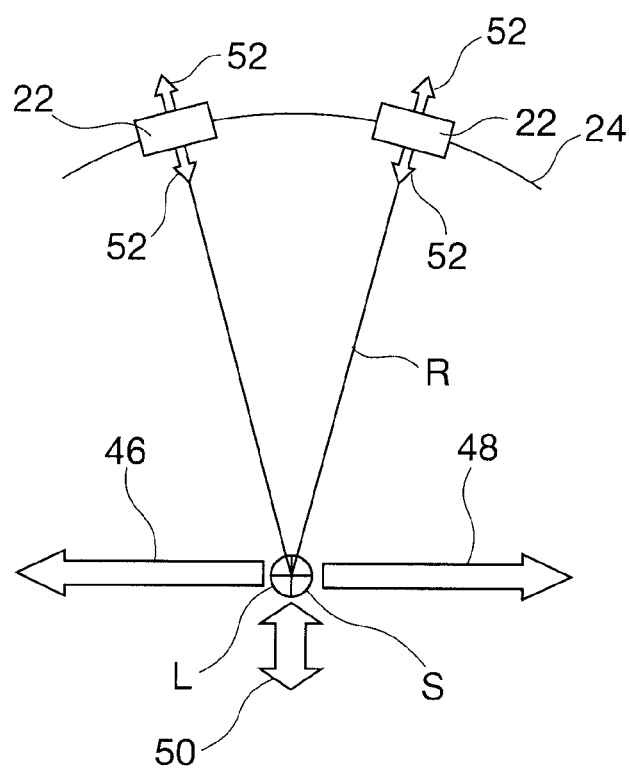
FIG. 5 shows a diagram of the forces acting on a load carrier according to one embodiment of the invention.

FIG. 5 shows a diagram with forces 46, 48, 50 acting on the load carrier 12 from the outside, showing that the corresponding resulting forces always act radially on the rail 24 and thus on the bearing unit 36.

All the forces acting on the load 14 from the outside, such as the shooting forces (recoil forces) 46, aerodynamic forces 48, and inertial forces (such as the gravitational force 50 of the load 14), act on the center of gravity S of the load 14. The direction of the forces 46, 48, 50 can be regarded as variable, but the point of attack will always be the center of gravity S. The counterforces 52 are formed by the supports (i.e., the car elements 22) as forces acting radially about the center of gravity S. Thus, no forces resulting from the externally acting forces 46, 48, 50 are acting in the direction of the actuator 20. The forces 52 can be absorbed completely by the rail 24 and the cars 22.

The load on the actuator 20 is thus relieved. A greater positional accuracy of the actuator 20 in comparison with conventional exterior load carriers can therefore be achieved. The load support can be adapted to various exterior loads 14 by adjusting the rail radius R.

In addition, it should be pointed out that "comprising" does not rule out any other elements or steps and "a/an" or "one" does not preclude a plurality. Furthermore, it should be pointed out that features or steps that have been described with reference to one of the above exemplary embodiments may also be used in combination with other features or steps of other exemplary embodiments described above. Reference numerals in the claims are not to be regarded as a restriction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Helicopter
12 Load carrier
14 Load
16 Standard flange

18 Carrier unit
L Pivot axis
20 Actuator
22 Car
24 Rail
26, 28 End of the rail
30 Load unit
32 Adapter structure
34 Load lock
36 Bearing unit
38 Running surface
40 Actuator unit
42 Rod
44 Setpoint transmitter
S Center of gravity
R Radius of rail
46 Restoring force
48 Aerodynamic force
50 Gravitational force
52 Counterforce

What is claimed is:

1. A load carrier configured to align a load of an aircraft, said load carrier comprising:
a carrier unit mounting the load carrier on the aircraft;
a load unit to mount the load; and
a bearing unit to pivot the load unit with respect to the carrier unit,
wherein the bearing unit comprises a curved rail element and at least one car element that is displaceable along the curved rail element,
wherein the curved rail element is arranged above the load and the curved rail element passes through the at least one car element.

2. The load carrier according to claim 1, wherein the load unit is pivotable about a pivot axis with respect to the carrier unit.

3. The load carrier according to claim 1, wherein the curved rail element comprises a segment of a circle.

4. The load carrier according to claim 1, wherein the curved rail element extends over an angle range of approximately 60°.

5. The load carrier according to claim 1, wherein the bearing unit comprises two car elements arranged at a distance of approximately 20° on the curved rail element.

6. The load carrier according to claim 1, wherein the curved rail element is attached to the load element, wherein the at least one car element is mounted on the carrier element.

7. The load carrier according to claim 1, wherein the bearing unit comprises a triggerable actuator configured to induce the pivoting of the load unit with respect to the carrier unit.

8. The load carrier according to claim 7, wherein the triggerable actuator comprises a control path sensor configured to detect a position of the actuator.

9. The load carrier according to claim 7, wherein the triggerable actuator is configured to produce a linear movement that is converted into a pivoting movement of the load unit with respect to the carrier unit.

10. The load carrier according to claim 7, wherein the triggerable actuator comprises an actuator unit and a rod that are configured to be linearly movable with respect to one another by the triggerable actuator, wherein the actuator unit is connected to the car element, wherein the rod is connected to one end of the curved rail.

11. The load carrier according to claim 7, wherein the load is mounted in the load unit, which is connected to the bearing unit in such a manner that recoil, aerodynamic, and inertial forces acting on a center of gravity of the load do not act in an actuation direction of the actuator.

12. The load carrier according to claim 1, wherein the load unit surrounds a load lock for the load in the manner of a clamp.

13. The load carrier according to claim 1, wherein the load has a front designed to face a direction of travel of the aircraft and the curved rail is arranged to pivot about a pivot axis that is transverse to the direction of travel of the aircraft.

14. A load carrier configured to align a load of an aircraft, said load carrier comprising:
a carrier unit mounting the load carrier on the aircraft;
a load unit to mount the load; and
a bearing unit to pivot the load unit with respect to the carrier unit,
wherein the bearing unit comprises a curved rail element and at least one car element that is displaceable along the curved rail element,
wherein a radius of the curved rail element is selected such that the load is pivotable by the load unit about a center of gravity of the load.

15. A helicopter, comprising:
a load carrier configured to align a load of the helicopter, said load carrier comprising
a carrier unit mounting the load carrier on the helicopter;
a load unit to mount the load; and
a bearing unit to pivot the load unit with respect to the carrier unit,
wherein the bearing unit comprises a curved rail element and at least one car element that is displaceable along the curved rail element,
wherein the curved rail element is arranged above the load and the curved rail element passes through the at least one car element.

16. The helicopter according to claim 15, wherein a pivot axis of the load element runs essentially parallel to the pitch axis of the helicopter.

17. The helicopter according to claim 15, wherein
the bearing unit comprises a triggerable actuator configured to induce the pivoting of the load unit with respect to the carrier unit, and
the load is mounted in the load unit, which is connected to the bearing unit in such a manner that recoil, aerodynamic, and inertial forces acting on a center of gravity of the load do not act in an actuation direction of the actuator.

18. The helicopter according to claim 15, wherein the curved rail is arranged to pivot about a pivot axis that is transverse to a direction of travel of the helicopter.

19. The helicopter according to claim 15, further comprising:
a fuselage, wherein the load carrier is mounted outside of the fuselage.

* * * * *